United States Patent [19]

Tai

[11] 4,073,763
[45] Feb. 14, 1978

[54] STABILIZATION OF CATIONICALLY MODIFIED ACRYLAMIDE POLYMERS

[75] Inventor: Wun Ten Tai, Palos Hills, Ill.

[73] Assignee: Nalco Chemical Company, Oak Brook, Ill.

[21] Appl. No.: 628,016

[22] Filed: Nov. 3, 1975

Related U.S. Application Data

[63] Continuation-in-part of Ser. No. 489,966, July 19, 1974, abandoned.

[51] Int. Cl.² ............................................ C08L 33/26
[52] U.S. Cl. .................. 260/29.4 UA; 260/29.6 HN; 260/29.6 WQ; 260/29.6 Z
[58] Field of Search ............. 260/29.4 UA, 29.6 HN, 260/29.6 WQ, 29.6 Z, 45.7 S

[56] References Cited

U.S. PATENT DOCUMENTS

| | | | |
|---|---|---|---|
| 2,761,834 | 9/1956 | Suen et al. ...................... 260/29.6 Z |
| 2,927,911 | 3/1960 | Lang ................................ 260/29.6 Z |
| 3,225,005 | 12/1965 | Asmus et al. ........................ 260/67 |
| 3,539,535 | 11/1970 | Wisner ................................ 260/72 |
| 3,556,933 | 1/1971 | Williams et al. .................... 162/167 |
| 3,620,991 | 9/1968 | Wasser ............................ 260/29.6 Z |
| 3,979,348 | 9/1976 | Ballweber et al. .......... 260/29.4 UA |

*Primary Examiner*—M. J. Welsh
*Attorney, Agent, or Firm*—John G. Premo; Robert A. Miller; Barry W. Sufrin

[57] ABSTRACT

A process for preparing cationic acrylamide polymers through the reaction of a formaldehyde-secondary amine adduct with a water-in-oil emulsion of finely divided acrylamide polymer formed by treatment with an oxygen containing halogen free inorganic acid or its alkali metal salts. The resulting products are further characterized in that they can be inverted easily into aqueous solution. Compositions produced by the invention are also disclosed.

3 Claims, No Drawings

STABILIZATION OF CATIONICALLY MODIFIED ACRYLAMIDE POLYMERS

This is a continuation-in-part application of Ser. No. 489,966 filed July 19, 1974 now abandoned.

INTRODUCTION

This invention relates to a new and improved method for preparing and stabilizing water-soluble cationic acrylamide polymers by reacting a formaldehyde adduct with a water-in-oil emulsion which contains dispersed therein a finely divided acrylamide polymer, followed by treatment with an oxygen containing halogen free inorganic acid (or its alkali metal salts). The formaldehyde adduct is prepared by reacting formaldehyde with a secondary amine. When the formaldehyde-secondary amine adduct is reacted with the emulsion-containing polymer, the resulting product is a water-in-oil emulsion of a finely divided cationic acrylamide polymer.

U.S. Pat. No. 2,328,901 teaches the reaction of a secondary amine with formaldehyde and then the reacting of the adduct so formed with a water-soluble polymer acrylamide.

There have been serious problems with these methods of prior art. Since the polyacrylamide is in an aqueous solution, the concentration of products obtained by these methods must be limited by the viscosity of the polymer. In order to eliminate this factor of low concentration, work has also been done on the preparation of solid cationically modified polymers of acrylamide. However, by the use of a solid polymer, the end-user is faced with extremely long times needed to solubilize these productions.

Ser. No. 551,467 filed Feb. 20, 1975, which is a continuation in part of Ser. No. 479,941 filed June 17, 1974 now abandoned, herein incorporated by reference, teaches the formation of cationically modified acrylamide polymers in both solution and emulsion form. However, stability of these polymers has not been as great as expected. It has now been found that these polymers can be stabilized by the method of this invention.

The method of this invention involves preparing the formaldehyde adduct and then reacting the adduct with a water-in-oil emulsion which contains dispersed therein a finely divided acrylamide polymer, followed by addition of a halogen free oxygen containing inorganic acid to effect stability. The method of this invention provides to the art a new and improved method for preparing stable cationic acrylamide polymers in a short period of time as well as providing a polymer with improved properties in high concentrations which can be inverted into aqueous solutions in a matter of seconds. No precipitation or drying steps need be used in this invention. Also, no time-consuming dissolution step is necessary. Therefore, this invention provides to the art a more economical method of providing cationically modified acrylamide polymers.

OBJECTS

It is therefore an object of this invention to provide an improved method for preparing stable water-soluble cationic polymers.

Another object of this invention is to provide a method for preparing water-soluble cationic polymers by reacting a formaldehyde adduct with a water-in-oil emulsion which contains dispersed therein a finely divided water-soluble vinyl addition polymer, followed by stabilization with an oxygen containing halogen free inorganic acid.

A further object of this invention is to provide a method for preparing a water-soluble cationic polymer by preparing a formaldehyde secondary amine adduct and reacting the adduct with a water-in-oil emulsion which contains dispersed therein a finely divided water-soluble vinyl addition polymer, followed by addition of sulfur dioxide to effect stability.

Other objects will appear hereinafter.

THE INVENTION

This invention involves a method for preparing stable water-soluble cationic polymers by preparing a formaldehyde adduct and reacting the adduct with a water-in-oil emulsion which contains dispersed therein a finely divided water-soluble acrylamide polymer, followed by addition to the emulsion of an oxygen containing halogen free inorganic acid.

THE WATER-IN-OIL EMULSION OF ACRYLAMIDE POLYMERS

The water-in-oil emulsions of finely divided acrylamide polymer useful in this invention are stable, yet at the same time contain relatively large amounts of polymer. The polymers dispersed in the emulsion are quite stable when the particle size of the polymer is in the range of 2 millimicrons up to about 5 microns. The preferred particle size is within the range of 5 millimicrons and 3 microns.

The stable water-in-oil emulsion comprises: 1. an aqueous phase; 2. a hydrophobic liquid; and 3. a water-in-oil emulsion emulsifying agent.

The polymer containing emulsion of this invention is comprised of an aqueous phase ranging from between 30 and 95 percent by weight of the emulsion. The aqueous phase is defined as the sum of the polymer or copolymer and the water present in the composition. The preferred range is between 50 and 90 percent by weight of the emulsion. The most preferred range is between 70 and 80 percent by weight of the emulsion.

The polymer concentration of the emulsion ranges between 10 – 50 percent by weight. A preferred range is between 25 and 40 percent by weight of the emulsion. The most preferred range is between 25 and 35 percent by weight of the emulsion.

For the purposes of this invention, the term, acrylamide polymer, includes acrylamide homopolymers and copolymers which contain at least 20 percent and preferably 75 percent by weight of acrylamide. The acrylamide polymers most commonly used in the practice of this invention include polyacrylamide and its water-soluble copolymers prepared by polymerizing acrylamide with monomers such as for instance, acrylic acid, methylacrylic acid, maleic anhydride, acrylonitrile, dimethylaminomethylmethacrylate. An acrylamide polymer also useful in the practice of this invention is hydrolized polyacrylamide which has from 1 – 50 percent of the original carboxamide groups hydrolized carboxyl groups. The molecular weights of such polymers and copolymers exceeds 500,000.

The molecular weight of the acrylamide polymers described above may vary over a wide range, e.g., 10,000 to 25 million. The preferred acrylamide polymer has a molecular weight in excess of one million.

The organic or oil phase of the emulsion is comprised of an inert hydrophobic liquid. The hydrophobic liquid comprises between 5 and 70 percent by weight of the emulsion. The preferred range is between 5 and 40 percent by weight of the emulsion. The most preferred range is between 20 and 30 percent by weight of the emulsion.

The oils used in preparing these emulsions may be selected from a large group of organic liquids which include liquid hydrocarbons and substituted liquid hydrocarbons. A preferred group of organic liquids are aliphatic hydrocarbons liquids which include blends of aromatic and aliphatic hydrocarbon compounds, which contain from 4 to 8 carbon atoms. Thus, such organic hydrocarbon liquids as benzene, xylene, toluene, mineral oils, kerosenes, naphtha and in certain instances, petroleum, may be used. A particularly useful oil from the standpoint of its physical and chemical properties is the branch-chain isoparaffinic solvent sold by Humble Oil and Refinery Company under the trade name "Isopar M". Typical specifications of this narrow-cut isoparaffinic solvent are set forth below in TABLE I.

TABLE I

| Specification Properties | Minimum | Maximum | Test Method |
|---|---|---|---|
| Gravity, API at 60/60° F. | 48.0 | 51.0 | ASTM D 287 |
| Color, Saybolt | 30 | — | ASTM D 156 |
| Aniline point, ° F. | 185 | — | ASTM D 611 |
| Sulfur, ppm | — | 10 | ASTM D 1266 (Nephelometric mod.) |
| Distillation, ° F. | | | |
| IBP | 400 | 410 | |
| Dry Point | — | 495 | |
| Flash point, ° F. (Pensky-Martens closed cup) | 160 | — | ASTM D 93 |

Any conventional water-in-oil emulsifying agent can be used such as sorbitan monostearate, sorbitan monooleate, and the so-called low HLB materials which are all documented in the literature and are summarized in the Atlas HLB Surfactant Selector. Although the mentioned emulsifiers are used in producing good water-in-oil emulsions, other surfactants may be used as long as they are capable of producing these emulsions. The water-in-oil emulsifying agent is presented in amounts ranging between 0.1 and 21.0 percent by weight of the emulsion. The preferred range is between 1.0 and 15.0 percent by weight of the emulsion. The most preferred range is between 1.2 and 10.0 percent by weight of the emulsion. It is important that the emulsifying agent selected does not react with the formaldehyde or formaldehyde adduct.

The polymers contemplated for use in this invention may be synthesized in emulsion form as described in Vanderhoff et al, U.S. Pat. No. 3,284,393 which is hereby incorporated by reference. The polymerization technique set forth in Vanderhoff is generally followed in preparing polymeric latexes used in this invention.

Also contemplated in the practice of this invention is the preparation of suitable water-in-oil emulsions of water-soluble polymers by the methods described in Anderson et al, U.S. Pat. No. 3,624,019 and U.S. Pat. No. 3,734,873, both of which are hereby incorporated by reference.

The water-in-oil emulsion used in the practice of this invention exhibits the unique ability of rapidly dissolving into aqueous solution. The polymer-containing emulsion releases the polymer in water in the presence of a surfactant in a very short period of time. This inversion technique is described in Anderson et al, U.S. Pat. No. 3,642,019 and U.S. Pat. No. 3,734,873.

THE FORMALDEHYDE ADDUCTS

To prepare a cationic polymer it is necessary to form a formaldehyde-secondary amine adduct. The formaldehyde-secondary amine adduct may be prepared by reacting an aqueous solution of formaldehyde or paraformaldehyde with the secondary amine. This reaction may take place at ambient temperature or may be performed at elevated temperatures. However, the reaction proceeds at a rapid rate at ambient temperature. The molar ratio of formaldehyde to secondary amine may vary over a wide range but the preferred ratio is within the range of 10:1 to 1:10. The most preferred ratio of formaldehyde to secondary amine is 2:1 to 1:2. The formaldehyde adduct should be prepared in as concentrated a form as possible so as to minimize dilution effects on the end product. However, due to the concentrations of commercial aqueous solutions of formaldehyde, and of aqueous amines, the concentration is limited. Preferably, the concentration of the adduct should be between 0.1 to 75 percent by weight. The most preferred concentration of the adduct is from 25 to 55 percent by weight in aqueous solution.

The preferred secondary amine used to prepare the formaldehyde adducts of this invention is dimethylamine. However, other secondary amines, preferably those containing 3 to 8 carbon atoms and which include methylethylamine, morpholine, diethylamine, piperideine, diisopropylamine and dibutylamine can be used. The amines used can be aliphatic or cyclic, straight chained or branched.

THE METHOD

Once the formaldehyde adduct is prepared, it is added to the water-in-oil emulsion of a finely divided acrylamide polymer. The molar ratio of the formaldehyde adduct to the acrylamide polymer contained in the water-in-oil emulsion of a finely divided acrylamide polymer may vary from 10:0.1 to 0.1:10, and preferably between 0.3:1 to 3.0:1. The most preferred mole ratio of formaldehyde adduct to the acrylamide polymer contained in the water-in-oil emulsion of finely divided acrylamide is 1:2 to 2:1.

Due to the volume of water present in the formaldehyde adduct solution, it is often advisable to add an amount of hydrophobic liquid, such as Isopar M, along with additional water-in-oil surfactants to keep the water-in-oil emulsion stable and fluid. The optimum amount of additional hydrophobic liquid to be added must be determined based on the water-in-oil emulsion containing the acrylamide polymer on an individual basis; however, it is often 25 to 75 percent by weight of the aqueous formaldehyde solution to be added. The additional water-in-oil emulsifier is added for stability purposes and also is determined on the basis of the acrylamide polymer emulsion being used, as well as the pH of operation and salt concentration. The additional emulsifier, however, is usually added in a 1 to 25 percent level on the amount of additional hydrophobic liquid added.

The reaction may be performed at ambient temperatures. However, the reaction may be heated to increase the reaction rate. The reaction is rapid, and is completed at ambient temperatures within approximately 60 minutes. Using a formaldehyde-secondary amine adduct, the reaction temperature should not exceed 170° F., and the minimum temperature should not be below about 30° F. The preferred temperature range of this reaction is between 70° to 140° F.

After allowing a sufficient period of time for the formaldehyde to react, a stable water-in-oil emulsion of a finely divided cationically modified acrylamide polymer results.

It has now been found that these cationically modified acrylamide polymers produced above can be further stabilized by the addition of a halogen-free oxygen-containing inorganic acid or its alkali metal salts to the water-in-oil emulsion of a finely divided cationically modified acrylamide polymer to bring the pH of the polymer emulsion to between 1 and 7.

Due to problems encountered with the stability of the cationic polymers previously described, including cross-linking from unreacted formaldehyde groups and a reversal of the aldehyde-amine reaction, work was done to find a suitable chemical additive that would be compatible with the water-in-oil emulsion yet at the same time react with unreacted formaldehyde present, either on the backbone of the polymer, or in solution so as to render the formaldehyde non-reactive and to eliminate cross-linking. Further qualifications for formaldehyde "scavengers" included the idea that the scavenger employed must be economically feasible for industrial work and must not cause significant dilution of the polymer product.

Various scavengers, those compounds which would react with formaldehyde to render it non-reactive, were employed in a study. Two considerations were evaluated in the selection of scavengers; 1) the stability of the water-in-oil emulsion in regard to the scavenger, i.e., compatibility with the latex, and 2) the effect that the scavenger had on the polymer. This listing of the more successful scavengers studied is found in Table II below, along with pH range studied and stability tests run on the two variables discussed above at 40° C.

TABLE II

| Scavenger | pH Range Studied | 40° C. Oven Stability Latex | Polymer |
|---|---|---|---|
| Ethylene Glycol | 6 – 9 | Good | ↑ |
| Resorcinol | 10.5 | Poor | |
| NH$_3$ | 8 – 11 | High pH, poor Low pH, good | Less than One Week |
| DMA | 8 – 13 | High pH, poor Low pH, good | ↓ |
| HOCH$_2$CH$_2$Cl | Inverted during addition | | |
| NaHSO$_3$ | 4 – 7 | Good | 2 weeks |
| SO$_2$ | 1 – 7 | Good | 4 weeks |
| — | 8 – 13 | Poor | less than 1 week |

As seen, the addition of sulfur dioxide or sodium bisulfite to the water-in-oil emulsion of a finely divided cationically modified acrylamide polymer dramatically increases the stability of the final product. Upon optimization of the desired level of sulfur dioxide, it was found that to obtain maximum stability of the cationically modified acrylamide polymer, 50 to 85 percent by weight sulfur dioxide (based on the polymer contained in the water-in-oil emulsion) had to be added to the water-in-oil emulsion of a finely divided cationically modified acrylamide polymer. A preferred range for optimized stability is 70 to 85 percent sulfur dioxide based on the cationically modified polymer contained in the water-in-oil emulsion. Using lower quantities of SO$_2$ results in less stable cationically modified acrylamide polymers.

While sodium bisulfite or any of the alkali metal salts such as KHSO$_3$ or K$_2$S$_2$O$_5$ or Na$_2$S$_2$O$_5$ may be used, the ability to introduce these compounds into water-in-oil emulsions in hampered due to their solubility in water and dilution by the water of the polymer latex. Other scavengers that apparently show promise include phosphoric acid and phosphorous acid.

In the addition of the stabilizers above to the water-in-oil emulsion of a finely divided acrylamide polymer, it is preferred to make the addition of the stabilizer at ambient temperatures or below ambient temperatures. This is partially due to the heat or neutralization formed between the excess amine present within the water-in-oil emulsion and the inorganic acid. Another reason for adding it at low temperatures is that the water-in-oil emulsion seems less readily shocked at these temperatures and therefore remains stable. The preferred temperature range of the addition of the halogen-free oxygen-containing inorganic acid is between 0° to 30° C. The most preferred temperature range is between 10° and 20° C.

The stable cationically modified acrylamide polymers which are the subject of my invention have utility as dewatering aids in the treatment of sewage, as paper retention aids, and as emulsion breakers.

EXAMPLE 1

| Acrylamide emulsion recipe: | |
|---|---|
| ISOPAR M | 27.60 grams |
| Sorbitan Monostearate | 1.65 grams |
| Water | 40.20 grams |
| Acrylamide | 36.51 grams |
| Sodium Hydroxide | 2.29 grams |
| 2,2' azobis (isobutyronitrile) | 0.07 grams |

The sorbitan monostearate was dissolved in the ISOPAR M and the resulting solution was poured into a two liter glass reactor fitted with a stirrer, thermometer, and nitrogen purge. The monomer solution was prepared by dissolving the acrylamide in water. The pH of the monomer solution was adjusted to 8.5 with sodium hydroxide. The monomer solution was added to the organic phase with rapid agitation. The reactor was purged for 30 minutes after which time the 2,2' azobis (isobutyronitrile) dissolved in acetone was added to the mixture. The emulsion was headed to 60° C. with agitation. The reaction proceeded for 2½ hours at which time it had reached completion. The resulting product was a stable emulsion.

EXAMPLE 2

| Acrylamide-acrylic acid emulsion recipe: | |
|---|---|
| ISOPAR M | 28.10 grams |
| Sorbitan Monostearate | 1.85 grams |
| Water | 40.00 grams |
| Acrylamide | 33.90 grams |
| Acrylic Acid | 2.40 grams |
| Sodium Hydroxide | 2.30 grams (approx.) |
| 2,2' azobis (isobutyronitrile) | 0.07 grams |

As in Example 1, the sorbitan monostearate was dissolved in the ISOPAR M and the resulting solution was poured into a two liter glass reactor fitted with a stirrer, thermometer, and nitrogen purge. The monomer solution was prepared by dissolving the acrylamide and acrylic acid in water. The pH of the monomer solution was adjusted to 8.5 with sodium hydroxide. The monomer solution was added to the organic phase with rapid agitation. The reactor was purged for 30 minutes after which time the 2,2' azobis (isobutyronitrile) dissolved in acetone was added to the mixture. The emulsion was heated to 60° C. with agitation. The reaction proceeded for 2½ hours at which time it had reached completion. The resulting product was a stable emulsion:

EXAMPLE 3

| Acrylamide-methacrylic acid emulsion recipe: | |
| --- | --- |
| ISOPAR M | 27.60 grams |
| Sorbitan Monostearate | 1.65 grams |
| Water | 40.20 grams |
| Acrylamide | 34.51 grams |
| Methacrylic Acid | 2.31 grams |
| Sodium Hydroxide | 2.29 grams |
| 2,2' azobis (isobutyronitrile) | 0.07 grams |

The sorbitan monostearate was dissolved in the ISOPAR M and the resulting solution was poured into a two liter glass reactor fitted with a stirrer, thermometer, and nitrogen purge. The monomer solution was prepared by dissolving the acrylamide and methacrylic acid in water. The pH of the monomer solution was adjusted to 8.5 with sodium hydroxide. The monomer solution was added to the organic phase with rapid agitation. The reactor was purged for 30 minutes after which time the 2,2' azobis (isobutyronitrile) dissolved in acetone was added to the mixture. The emulsion was heated to 60° C. with agitation. The reaction proceeded for 2½ hours at which time it has reached completion. The resulting product was a stable emulsion.

This invention is further illustrated by the following examples:

EXAMPLE 4

To a 500 ml flask was added 79.0 g of an aqueous 38 percent formaldehyde solution followed by 90.0 g of an aqueous 60 percent solution of dimethylamine. The mixture was agitated and kept at temperatures below 104° F. for 10 minutes.

EXAMPLE 5

To 210.7 g of the emulsion in Example 1 was added 64.0 g of ISOPAR M and 7.7 g of Sorbitan Monooleate with agitation to produce a stable water-in-oil emulsion. 169.0 g of the aqueous formaldehydedimethylamine adduct prepared in Example 4 was then added to this emulsion with agitation at room temperature. The pH of the system was alkaline due to excess amine present in the formaldehyde adduct solution. The mixture was then heated at 113° F. for 1 hour with agitation to produce a water-in-oil emulsion of a finely divided cationically modified acrylamide polymer.

EXAMPLE 6

To 100 g of the stirred water-in-oil emulsion of a finely-divided cationically modified acrylamide polymer of Example 5 was bubbled through at 10° C 22.0 g of gaseous sulfur dioxide over a period of 15 minutes to a pH of 2. The resulting water-in-oil emulsion of a finely divided cationically modified acrylamide polymer was stable for several months at room temperature.

EXAMPLE 7

The procedures of Examples 5 and 6 were followed with the latex emulsion of Example 2 being used instead of that of Example 1. The resulting emulsion was stable for several months at ambient temperature.

I claim:

1. A method for improving the stability of a water-in-oil emulsion of a finely divided cationically modified acrylamide polymer, said polymer being made essentially by the steps of:
    A. Preparing an aqueous solution of formaldehyde and a secondary amine containing 2 to 8 carbon atoms with the molar ratio of formaldehyde to secondary amine containing 2 to 8 carbon atoms being from 10:1 to 1:10 to provide a formaldehyde adduct; and,
    B. Adding the formaldehyde adduct prepared in Step A to a water-in-oil emulsion of a finely divided acrylamide polymer in an amount sufficient to provide a molar ratio of formaldehyde adduct to acrylamide polymer of from 10:0.1 to 0.1:10, said water-in-oil emulsion of finely divided acrylamide polymer containing from:
        a. 10–50% by weight polymer;
        b. 30–95% by weight of an aqueous phase consisting of the polymer and the water present;
        c. 5–70% by weight of a hydrophobic hydrocarbon liquid; and,
        d. 1.0 to 21.0% by weight of a water-in-oil emulsifying agent; followed by,
    C. Mixing the formaldehyde adduct and said water-in-oil emulsion of a finely divided acrylamide polymer for a period of time sufficient to produce a stable water-in-oil emulsion of a finely divided cationically modified acrylamide polymer;
said improvement comprising adding to said water-in-oil emulsion of a finely divided cationically modified acrylamide polymer at a temperature of from about 0° to about 40° C. a stabilizer selected from the group consisting of $SO_2$, $NaHSO_3$, $KHSO_3$, $Na_2S_2O_5$, and $K_2S_2O_5$ to adjust the pH of said water-in-oil emulsion to between 1 and 7, over a time sufficient to produce a water-in-oil emulsion of a cationically modified acrylamide polymer having increased stability.

2. The method of claim 1 wherein the stabilizer is added at a level of 70–85% by weight based on the finely divided cationically modified acrylamide polymer contained in the water-in-oil emulsion.

3. A stable water-in-oil emulsion of a finely divided cationically modified acrylamide polymer which comprises:
    A. A water-in-oil emulsion of a finely divided acrylamide polymer which contains from:
        a. 10–50% by weight acrylamide polymer;
        b. 30–95% by weight of an aqueous phase consisting of the polymer and the water present;
        c. 5–70% by weight of a hydrophobic liquid; and,
        d. 1.0–21% by weight of a water-in-oil emulsifying agent, said water-in-oil emulsion being reacted with;
    B. A quantity of an aqueous solution which contains from 0.1 to 75% by weight of an adduct made from formaldehyde and a secondary amine containing 2 to 8 carbon atoms, said adduct being formed from reacting an aqueous formaldehyde solution with a secondary amine containing 2 to 8 carbon atoms in molar ratios of from 1:10 to 10:1, so that the molar ratio of said formaldehyde adduct to said acrylamide polymer is from 2:1 to 1:2, and,
    C. A compound selected from the group consisting of $SO_2$, $NaHSO_3$, $Na_2S_2O_5$, $KHSO_3$, and $K_2S_2O_5$ so that the pH of said stable water-in-oil emulsion of finely divided acrylamide polymer is from 1–7.

* * * * *